United States Patent
Yin et al.

(10) Patent No.: US 11,036,978 B2
(45) Date of Patent: Jun. 15, 2021

(54) METHOD FOR SEPARATING OUT A DEFECT IMAGE FROM A THERMOGRAM SEQUENCE BASED ON WEIGHTED NAIVE BAYESIAN CLASSIFIER AND DYNAMIC MULTI-OBJECTIVE OPTIMIZATION

(71) Applicant: UNIVERSITY OF ELECTRONIC SCIENCE AND TECHNOLOGY OF CHINA, Sichuan (CN)

(72) Inventors: Chun Yin, Chengdu (CN); Yuhua Cheng, Chengdu (CN); Ting Xue, Chengdu (CN); Xuegang Huang, Chengdu (CN); Haonan Zhang, Chengdu (CN); Kai Chen, Chengdu (CN); Anhua Shi, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 119 days.

(21) Appl. No.: 16/370,202

(22) Filed: Mar. 29, 2019

(65) Prior Publication Data

US 2019/0228221 A1    Jul. 25, 2019

(30) Foreign Application Priority Data

May 29, 2018 (CN) .......................... 201810527596.9
Nov. 30, 2018 (CN) .......................... 201811451824.5
Jan. 9, 2019 (CN) .......................... 201910019827.X (51) Int. Cl.
| | | |
|---|---|---|
| G06K 9/46 | (2006.01) | |
| G06K 9/66 | (2006.01) | |
| G06K 9/00 | (2006.01) | |
| G06K 9/62 | (2006.01) | |
| G06T 7/00 | (2017.01) | |

(Continued)

(52) U.S. Cl.
CPC ......... G06K 9/00523 (2013.01); G06F 17/16 (2013.01); G06K 9/00536 (2013.01);
(Continued)

(58) Field of Classification Search
CPC ...................... G06F 17/18; G06F 17/16; G06T 2207/10048; G06T 2207/20072;
(Continued)

(56) References Cited

U.S. PATENT DOCUMENTS 5,774,177 A * 6/1998 Lane ........................ D06H 3/08
  348/128
6,650,789 B2 * 11/2003 Edgar .................. H04N 1/4097
  382/260

(Continued)

OTHER PUBLICATIONS

Huang et al., Adaptive rapid defect identification in ECPT based on K-means and automatic segmentation algorithm, 2018, Journal of Ambient Intelligence and Humanized Computing, https://doi.org/10.1007/s12652-017-0671-5, pp. 1-18, AAPA via IDS.*

(Continued)

*Primary Examiner* — Guillermo M Rivera-Martinez
(74) *Attorney, Agent, or Firm* — Oliff PLC (57) ABSTRACT

The present invention provides a method for separating out a defect image from a thermogram sequence based on weighted naive Bayesian classifier and dynamic multi-objective optimization, we find that different kinds of TTRs have big differences in some physical quantities. The present invention extracts these features (physical quantities) and classifies the selected TTRs into K categories based on their feature vectors through a weighted naive Bayesian classifier, which deeply digs the physical meanings contained in each TTR, makes the classification of TTRs more rational, and improves the accuracy of defect image's separation. Meanwhile, the multi-objective function does not only fully consider the similarities between the RTTR and other TTRs in the same category, but also considers the dissimilarities between the RTTR and the TTRs in other categories, thus the RTTR selected is more representative, which guarantees the accuracy of describing the defect outline. And the initial (Continued)

TTR population corresponding to the approximate solution for multi-objective optimization is chosen according to the previous TTR populations, which makes the multi-objective optimization dynamic and reduces its time consumption.

3 Claims, 7 Drawing Sheets

(51) Int. Cl.
  *G06N 7/00* (2006.01)
  *G06F 17/16* (2006.01)
  *G06K 9/20* (2006.01)
(52) U.S. Cl.
  CPC ......... *G06K 9/2018* (2013.01); *G06K 9/6215* (2013.01); *G06K 9/6218* (2013.01); *G06K 9/6296* (2013.01); *G06N 7/005* (2013.01); *G06T 7/0002* (2013.01); *G06T 2207/10048* (2013.01); *G06T 2207/20224* (2013.01)
(58) Field of Classification Search
  CPC ..... G06T 7/0004; G06T 7/0006; G06T 7/162; G06T 2207/10016; G06T 7/0002; G06T 7/00; G06T 3/4015; G06T 2207/10024; G06T 2207/20192; G06T 3/4007; G06T 2207/30216; G06T 7/187; G06T 2207/20081; G06K 9/00536; G06K 9/6296; G06K 9/00523; G06K 9/6215; G06K 2009/00322; G06K 9/0061; G06K 9/6218; G06K 9/6278; G06K 9/2018; G06K 9/342; G06N 5/003; G06N 7/005; G06N 7/02; H04N 5/367; H04N 19/98; H04N 2209/042; H04N 9/646; H04N 1/624

See application file for complete search history.

(56) References Cited

U.S. PATENT DOCUMENTS

| | | | | |
|---|---|---|---|---|
| 6,928,192 | B2 * | 8/2005 | Kobilansky | G06T 7/20 348/E5.051 |
| 7,123,299 | B1 * | 10/2006 | Yoshida | H04N 9/045 348/277 |
| 8,144,222 | B2 * | 3/2012 | Kanemitsu | H04N 9/646 348/273 |
| 10,229,486 | B2 | 3/2019 | Gao et al. | |
| 2004/0095475 | A1 * | 5/2004 | Yamamoto | H04N 9/045 348/222.1 |
| 2005/0196067 | A1 * | 9/2005 | Gallagher | G06K 9/0061 382/275 |
| 2007/0229676 | A1 * | 10/2007 | Tanaka | H04N 9/646 348/223.1 |
| 2008/0117318 | A1 * | 5/2008 | Aoki | H04N 5/367 348/246 |
| 2010/0260374 | A1 * | 10/2010 | Akashi | G06T 7/0004 382/100 |
| 2012/0257825 | A1 * | 10/2012 | Yoo | G06T 5/005 382/167 |
| 2015/0355118 | A1 * | 12/2015 | Heissenstein | G01N 25/72 250/340 |
| 2017/0297095 | A1 * | 10/2017 | Zalameda | B22D 46/00 |
| 2018/0068432 | A1 * | 3/2018 | Gao | G06T 7/0006 |
| 2018/0097992 | A1 * | 4/2018 | Douady-Pleven | H04N 9/646 |
| 2019/0102874 | A1 * | 4/2019 | Goja | G06N 20/00 |

OTHER PUBLICATIONS

Zhu et al., An improved feature extraction algorithm for automatic defect identification based on eddy current pulsed thermography, 2018, Mechanical Systems and Signal Processing 113 (2018), pp. 5-21, AAPA via IDS.*

Huang, Xuegang et al., "Adaptive Rapid Defect Identification in ECPT Based on K-Means and Automatic Segmentation Algorithm", Journal of Ambient Intelligence and Humanized Computing, pp. 1-18, (2017); url:<https://doi.org/10.1007/s12652-017-0671-5>.

Zhu, Peipei et al., "An Improved Feature Extraction Algorithm for Automatic Defect Dentification Based on Eddy Current Pulsed Thermography", Mechanical Systems and Signal Processing, vol. 113, pp. 5-21, (2018).

Zhang, Bo et al., "Design of an Automatic Defect Identification Method Based ECPT for Pneumatic Pressure Equipment", Complexity, pp. 1-17, (2018); url: <https://doi.org/10.1155/2018/5423924>.

* cited by examiner

METHOD FOR SEPARATING OUT A DEFECT IMAGE FROM A THERMOGRAM SEQUENCE BASED ON WEIGHTED NAIVE BAYESIAN CLASSIFIER AND DYNAMIC MULTI-OBJECTIVE OPTIMIZATION

FIELD OF THE INVENTION

This application claims priorities under the Paris Convention to Chinese Patent Application No. 201810527601.6, filed May 29, 2018, Chinese Patent Application No. 201811451824.5, filed Nov. 30, 2018, and Chinese Patent Application No. 201910019827.X, filed Jan. 9, 2019, the entirety of which is hereby incorporated by reference for all purposes as if fully set forth herein.

The present invention relates to the field of Non-destructive Testing (NDT), more particularly to a method for separating out a defect image from a thermogram sequence based on weighted Naive Bayesian classifier and multi-objective optimization.

BACKGROUND OF THE INVENTION

Non-destructive Testing (NDT) is a wide group of analysis techniques used in science and technology industry to evaluate the properties of a material, component or system without causing damage. Infrared thermal image detection is one kind of NDT, which obtains the structure information of material through the control of heating and the measurement of surface temperature variation.

Infrared thermal image detection is widely used in various fields of non-destructive testing, because it is fast, safe, and does not require direct contact. In the process of heating, the distribution of Joule heat can be affected by the location of the defect(s) of the material under test. The high Joule heat leads to high temperature area and the low Joule heat leads to low temperature area. The different temperatures can be recorded by the infrared thermal imaging camera, then a thermogram sequence is obtained. For a pixel in the thermogram sequence, its temperature variation with time is called as a transient thermal response (TTR). By distinguishing the difference of TTRs, we can separate out a defect image from the thermal sequence.

In order to separate the defect image, many methods are used to process the thermogram sequence, typical one of them is Fuzzy C-means (FCM). FCM classifies the TTRS through clustering centers based on membership values, its classification is a process of choosing a minimal distance between a TTR and each cluster center. Thus, FCM does not deeply dig the physical meanings contained in each TTR, which makes the rationality of clustering abated, and lowers the accuracy of defect separation.

SUMMARY OF THE INVENTION

The present invention aims to overcome the deficiencies of the prior art and provides a method for separating out a defect image from a thermogram sequence based on weighted naive Bayesian classifier and dynamic multi-objective optimization so as to enhance the rationality of clustering by deeply digging the physical meanings contained in each TTR, thus the accuracy of defect separation is improved.

To achieve these objectives, in accordance with the present invention, a method for separating out a defect image from a thermogram sequence based on weighted naive Bayesian classifier and dynamic multi-objective optimization is provided, comprising:

(1). taking a thermogram sequence, recorded by an infrared thermal imaging camera, as a three-dimensional (3D) matrix denoted by S, where an element S(i,j,t) of 3D matrix S is a pixel value of row i and column j of the thermogram sequence's frame t, each frame has I rows and J columns;

(2). selecting G transient thermal responses (TTRs) from 3D matrix S, then extracting each TTR's features: $E^g$, $V_{up}^g$, $V_{down}^g$, $T_{ave}^g$, $T_{max}^g$;

where $E^g$ is the TTR's energy, and calculated according to the following equation:

$$E^g = x_{g,1}^2 + x_{g,2}^2 + \ldots + x_{g,T}^2$$

g is the serial number of the TTR, g=1, 2, ..., G, $x_{g,t}$ is the pixel value (temperature value) of TTR g at frame t, t represents 1, 2, ..., T, T is the number of frames of the thermogram sequence;

where $V_{up}^g$ is the TTR's temperature change rate during endothermic process, and calculated according to the following equation:

$$V_{up}^g = \frac{x_{g,t_{mid}} - x_{g,t_0}}{t_{mid} - t_0}$$

$t_{mid}$ is the serial number of the last heating frame, $x_{g,t_{mid}}$ is the pixel value (temperature value) of TTR g at frame $t_{mid}$, $t_0$ is the serial number of the first heating frame, $x_{g,t_0}$ is the pixel value (temperature value) of TTR g at frame $t_0$;

where $V_{down}^g$ is the TTR's temperature change rate during endothermic process, and calculated according to the following equation:

$$V_{down}^g = \frac{x_{g,t_{mid}} - x_{g,t_{end}}}{t_{end} - t_{mid}}$$

$t_{end}$ is the serial number of the last heat releasing frame, $x_{g,t_{end}}$ is the pixel value (temperature value) of TTR g at frame $t_{end}$;

where $T_{ave}^g$ is the TTR's average temperature, and calculated according to the following equation:

$$T_{ave}^g = \frac{x_{g,1} + x_{g,2} + \ldots + x_{g,T}}{T}$$

where $T_{max}^g$ is the TTR's maximum temperature, and calculated according to the following equation:

$$T_{max}^g = \max(x_{g,1}, x_{g,2}, \ldots, x_{g,T});$$

(3). creating a feature vector for each TTR, where the feature vector is denoted by $X_g = (E^g, V_{up}^g, V_{down}^g, T_{ave}^g, T_{max}^g)$, g=1, 2, ..., G;

then discretizing the elements of feature vector $X_g$, where the discrete value of $E^g$ is denoted by $E_1$, $E_2$, $E_3$ or $E_4$ according to the value of $E^g$, the discrete value of $V_{up}^g$ is denoted by $V_{up1}$, $V_{up2}$, $V_{up3}$ or $V_{up4}$ according to the value of $V_{up}^g$, the discrete value of $V_{down}^g$ is denoted by $V_{down1}$, $V_{down2}$, $V_{down3}$ or $V_{down4}$ according to the value of $V_{down}^g$, the discrete value of $T_{ave}^g$ is denoted by $T_{ave1}$, $T_{ave2}$, $T_{ave3}$ or $T_{ave4}$ according to the value of $T_{ave}^g$, the discrete value of $T_{max}^g$ is denoted by $T_{max1}$, $T_{max2}$, $T_{max3}$ or $T_{max4}$ according to the value of $T_{max}^g$;

then classifying the G TTRs into K' categories based on their feature vectors through a weighted naive Bayesian classifier, where the weighted naive Bayesian classifier is:

$$h_{nb}(X_g) = \underset{c_k \in C}{\arg\max}\, p(c_k)p(X_g \mid c_k)$$

$c_k$ is the $k^{th}$ category of the G TTRs, C is a class set and denoted by $C=(c_1, c_2, \ldots, c_{K'})$, $h_{nb}(X_g)$ is the category of the $g^{th}$ TTR classified by its feature vector $X_g$, i.e. category $c_k$ which has the maximal value of $p(c_k)p(X_g|c_k)$ is the category of the $g^{th}$ TTR;

where $p(c_k)$ is the prior probability of category $c_k$, and its value is:

$$p(c_k) = \frac{N_{c_k}}{N_{total}}$$

$N_{total}$ is the number of historic TTRs used for training, $N_{c_k}$ is the number of the TTRs which belong to category $c_k$ among the historic TTRs;

where $p(X_g|c_k)$ is the likelihood probability that the $g^{th}$ TTR belongs to category $c_k$, and its value is:

$$p(X_g \mid c_k) = p(E^g \mid c_k)^{w_E} \cdot p(V_{up}^g \mid c_k)^{w_{V_{up}}} \cdot p(V_{down}^g \mid c_k)^{w_{V_{down}}} \cdot p(T_{ave}^g \mid c_k)^{w_{T_{ave}}} \cdot p(T_{max}^g \mid c_k)^{w_{T_{max}}}$$

the weights $w_E$, $w_{V_{up}}$, $w_{V_{down}}$, $w_{T_{ave}}$, $w_{T_{max}}$ are.

$$w_E = \frac{\dfrac{N_{E_1}}{N_{total}} \cdot KL(C \mid E_1) + \dfrac{N_{E_2}}{N_{total}} \cdot KL(C \mid E_2) + \dfrac{N_{E_3}}{N_{total}} \cdot KL(C \mid E_3) + \dfrac{N_{E_4}}{N_{total}} \cdot KL(C \mid E_4)}{Z}$$

$$w_{V_{up}} = \frac{\dfrac{N_{V_{up1}}}{N_{total}} \cdot KL(C \mid V_{up1}) + \dfrac{N_{V_{up2}}}{N_{total}} \cdot KL(C \mid V_{up2}) + \dfrac{N_{V_{up3}}}{N_{total}} \cdot KL(C \mid V_{up3}) + \dfrac{N_{V_{up4}}}{N_{total}} \cdot KL(C \mid V_{up4})}{Z}$$

$$w_{V_{down}} = \frac{\dfrac{N_{V_{down1}}}{N_{total}} \cdot KL(C \mid V_{down1}) + \dfrac{N_{V_{down2}}}{N_{total}} \cdot KL(C \mid V_{down2}) + \dfrac{N_{V_{down3}}}{N_{total}} \cdot KL(C \mid V_{down3}) + \dfrac{N_{V_{down4}}}{N_{total}} \cdot KL(C \mid V_{down4})}{Z}$$

$$w_{T_{ave}} = \frac{\dfrac{N_{T_{ave1}}}{N_{total}} \cdot KL(C \mid T_{ave1}) + \dfrac{N_{T_{ave2}}}{N_{total}} \cdot KL(C \mid T_{ave2}) + \dfrac{N_{T_{ave3}}}{N_{total}} \cdot KL(C \mid T_{ave3}) + \dfrac{N_{T_{ave4}}}{N_{total}} \cdot KL(C \mid T_{ave4})}{Z}$$

$$w_{T_{max}} = \frac{\left(\dfrac{N_{T_{max1}}}{N_{total}} \cdot KL(C \mid T_{max1}) + \dfrac{N_{T_{max2}}}{N_{total}} \cdot KL(C \mid T_{max2}) + \dfrac{N_{T_{max3}}}{N_{total}} \cdot KL(C \mid T_{max3}) + \dfrac{N_{T_{max4}}}{N_{total}} \cdot KL(C \mid T_{max4})\right)}{(Z)}$$

where $$Z = \sum_{h=1}^{4} \left( \begin{array}{c} N_{E_h}KL(C \mid E_h) + N_{V_{uph}}KL(C \mid V_{uph}) + \\ N_{V_{downh}}KL(C \mid V_{downh}) + \\ N_{T_{aveh}}KL(C \mid T_{aveh}) + N_{T_{maxh}}KL(C \mid T_{maxh}) \end{array} \right) \bigg/ 5N_{total}$$

where $$KL(C \mid E_h) = \sum_{k=1}^{K} p(c_k \mid E_h) \log\left(\frac{p(c_k \mid E_h)}{p(c_k)}\right)$$

$$KL(C \mid V_{uph}) = \sum_{k=1}^{K} p(c_k \mid V_{uph}) \log\left(\frac{p(c_k \mid V_{uph})}{p(c_k)}\right)$$

$$KL(C \mid V_{downh}) = \sum_{k=1}^{K} p(c_k \mid V_{downh}) \log\left(\frac{p(c_k \mid V_{downh})}{p(c_k)}\right)$$

$$KL(C \mid T_{aveh}) = \sum_{k=1}^{K} p(c_k \mid T_{aveh}) \log\left(\frac{p(c_k \mid T_{aveh})}{p(c_k)}\right)$$

$$KL(C \mid T_{maxh}) = \sum_{k=1}^{K} p(c_k \mid T_{maxh}) \log\left(\frac{p(c_k \mid T_{maxh})}{p(c_k)}\right)$$

where $N_{E_1}$, $N_{E_2}$, $N_{E_3}$ and $N_{E_4}$ are respectively the number of the TTRs of discrete value $E_1$, the number of the TTRs of discrete value $E_2$, the number of the TTRs of discrete value $E_3$ and the number of the TTRs of discrete value $E_4$ among the historic TTRs; $N_{V_{up1}}$, $N_{V_{up2}}$, $N_{V_{up3}}$ and $N_{V_{up4}}$ are respectively the number of the TTRs of discrete value $V_{up1}$, the number of the TTRs of discrete value $V_{up2}$, the number of the TTRs of discrete value $V_{up3}$ and the number of the TTRs of discrete value $V_{up4}$ among the historic TTRs; $N_{V_{down1}}$, $N_{V_{down2}}$, $N_{V_{down3}}$ and $N_{V_{down4}}$ are respectively the number of the TTRs of discrete value $V_{down1}$, the number of the TTRs of discrete value $V_{down1}$, the number of the TTRs of discrete value $V_{down3}$ and the number of the TTRs of discrete value $V_{down4}$ among the historic TTRs; $N_{T_{ave1}}$, $N_{T_{ave2}}$, $N_{T_{ave3}}$ and $N_{T_{ave4}}$ are respectively the number of the TTRs of discrete value $T_{ave1}$, the number of the TTRs of discrete value $T_{ave2}$, the number of the TTRs of discrete value $T_{ave3}$ and the number of the TTRs of discrete value $T_{ave4}$ among the historic TTRs; $N_{T_{max1}}$, $N_{T_{max2}}$, $N_{T_{max3}}$ and $N_{T_{max4}}$ are respectively the number of the TTRs of discrete value $T_{max1}$, the number of the TTRs of discrete value $T_{max2}$, the number of the TTRs of discrete value $T_{max3}$ and the number of the TTRs of discrete value $T_{max4}$ among the historic TTRs;

where h is the serial number of discrete value, KL is Kullback-Leibler divergence operation, $p(c_k|E_h)$, $p(c_k|V_{uph})$, $p(c_k|V_{downh})$, $p(c_k|T_{aveh})$ and $p(c_k|T_{max\,h})$ are respectively the posterior probability that discrete value $E_h$ belongs to category $c_k$, the posterior probability that discrete value, $V_{uph}$ belongs to category $c_k$, the posterior probability that discrete value $V_{downh}$ belongs to category $c_k$, the posterior probability that discrete value $T_{aveh}$ belongs to category $c_k$ and discrete value $T_{max\,h}$ belongs to category $c_k$;

then discarding the categories in which the number of TTRs is less than a threshold to obtain K categories;

(4). selecting a RTTR (Representative Transient Thermal Response) for each category based on feature vector through dynamic multi-objective optimization, where the multi-objective function is:

$$\text{minimize}\, F(_iX) = (f_1(_iX), \ldots, f_K(_iX))^T$$

$_iX$ is a feature vector of a TTR selected from category i', $_iX=(_i\overline{E}, _i\overline{V}_{up}, _i\overline{V}_{down})$, $_i\overline{E}$ is the normalized energy value of the TTR, $_i\overline{V}_{up}$ is the normalized temperature change rate of the TTR during endothermic process, $_i\overline{V}_{down}$ is the normalized temperature change rate of the TTR during endothermic process, the center of feature vectors of category i' is denoted by $_{i'}X_{center}=(_{i'}\overline{E}_{Center}, _{i'}\overline{V}_{up\_Center}, _{i'}\overline{V}_{down\_Center})$;

$f_1(_{i'}X)$ is the Euclidean distance between feature vector $_iX$ and center $_{i'}X_{center}$, and can be calculated according to the following equation:

$$f_1(_{i'}X) = \min \sqrt{(_{i'}\overline{E} - _{i'}\overline{E}_{Center})^2 + (_{i'}\overline{V}_{up} - _{i'}\overline{V}_{up\_Center})^2 + (_{i'}\overline{V}_{down} - _{i'}\overline{V}_{down\_Center})^2}$$

$f_k(_iX)$, k=2, 3, ..., K are renumbered Euclidean distances $f_{i'j'}(_iX)$ between feature vector $_iX$ and center $_jX_{center}$ of feature vectors of category j', j'≠i', $_jX_{center}=(_{j'}\overline{E}_{Center}, _{j'}\overline{V}_{up\_Center}, _{j'}\overline{V}_{down\_Center})$ and can be calculated according to the following equation:

$$f_{i'j'\atop j'\ne i'}(_{i'}X) = \min\left(-\sqrt{(_{i'}\overline{E} - _{j'}\overline{E}_{Center})^2 + (_{i'}\overline{V}_{up} - _{j'}\overline{V}_{up\_Center})^2 + (_{i'}\overline{V}_{down} - _{j'}\overline{V}_{down\_Center})^2}\right)$$

where the initial TTR population corresponding to the approximate solution for multi-objective optimization is chosen according to the two TTR populations respectively corresponding to the two approximate solutions of previous two defect image separations;

(5). putting the RTTRs of K categories by column to create a matrix Y, where a column is a RTTR, which contains T pixel values of the RTTR, the matrix Y is a matrix with size of T×K;

(6). linking the back column to the front column from the first column for each frame of 3D matrix S to obtain T columns of pixels, putting the T columns of pixels by frame order to create a two-dimensional image matrix O with I×J rows and T columns, then performing liner transformation to matrix Y with two-dimensional image matrix O: $R=Y^{-1}*O^T$ to obtain a two-dimensional image matrix R, where $Y^{-1}$ is the pseudo-inverse matrix of matrix Y with size of K×T, $O^T$ is the transpose matrix of two-dimensional image matrix O, two-dimensional image matrix R has K rows and I×J columns;

(7). dividing a row of two-dimensional image matrix R into I rows by column size of J, and putting the I rows together by order to obtain a two-dimensional image with size of I×J, where two-dimensional image matrix R has K rows, thus K two-dimensional images are obtained, selecting a two-dimensional image which has maximal difference of pixel value between defect area and non-defect area from the K two-dimensional images;

(8). using Fuzzy C-Mean algorithm to cluster the selected two-dimensional image: obtaining each pixel's cluster according to pixel's maximal membership, then setting the pixel value of each cluster center to all pixels of the cluster which the cluster center belongs to, where the selected two-dimensional image is turned into a separated image, and converting the separated image into a binary image, where the binary image is the defect image separated from the thermogram sequence.

The objectives of the present invention are realized as follows:

In the present invention, i.e. a method for separating out a defect image from a thermogram sequence based on weighted naive Bayesian classifier and dynamic multi-objective optimization, we find that different kinds of TTRs have big differences in some physical quantities, such as the energy, temperature change rate during endothermic process, temperature change rate during endothermic process, average temperature, maximum temperature. The present invention extracts these features (physical quantities) and classifies the selected TTRs into K categories based on their feature vectors through a weighted naive Bayesian classifier, which deeply digs the physical meanings contained in each TTR, makes the classification of TTRs more rational, and improves the accuracy of defect image's separation.

Meanwhile, the present invention creates a multi-objective function to select a RTTR for each category based on dynamic multi-objective optimization. The multi-objective function does not only fully consider the similarities between the RTTR and other TTRs in the same category, but also considers the dissimilarities between the RTTR and the TTRs in other categories, thus the RTTR selected is more representative, which guarantees the accuracy of describing the defect outline. And the initial TTR population corresponding to the approximate solution for multi-objective optimization is chosen according to the previous TTR populations, which makes the multi-objective optimization dynamic and reduces its time consumption.

BRIEF DESCRIPTION OF THE DRAWING

The above and other objectives, features and advantages of the present invention will be more apparent from the following detailed description taken in conjunction with the accompanying drawings, in which:

FIGS. 10 (a), 10 (b), and 10 (c) are diagrams of 3 RTTRs selected from 3 categories respectively in accordance with one embodiment of present invention;

DETAILED DESCRIPTION OF THE PREFERRED EMBODIMENT

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

Figure 1:
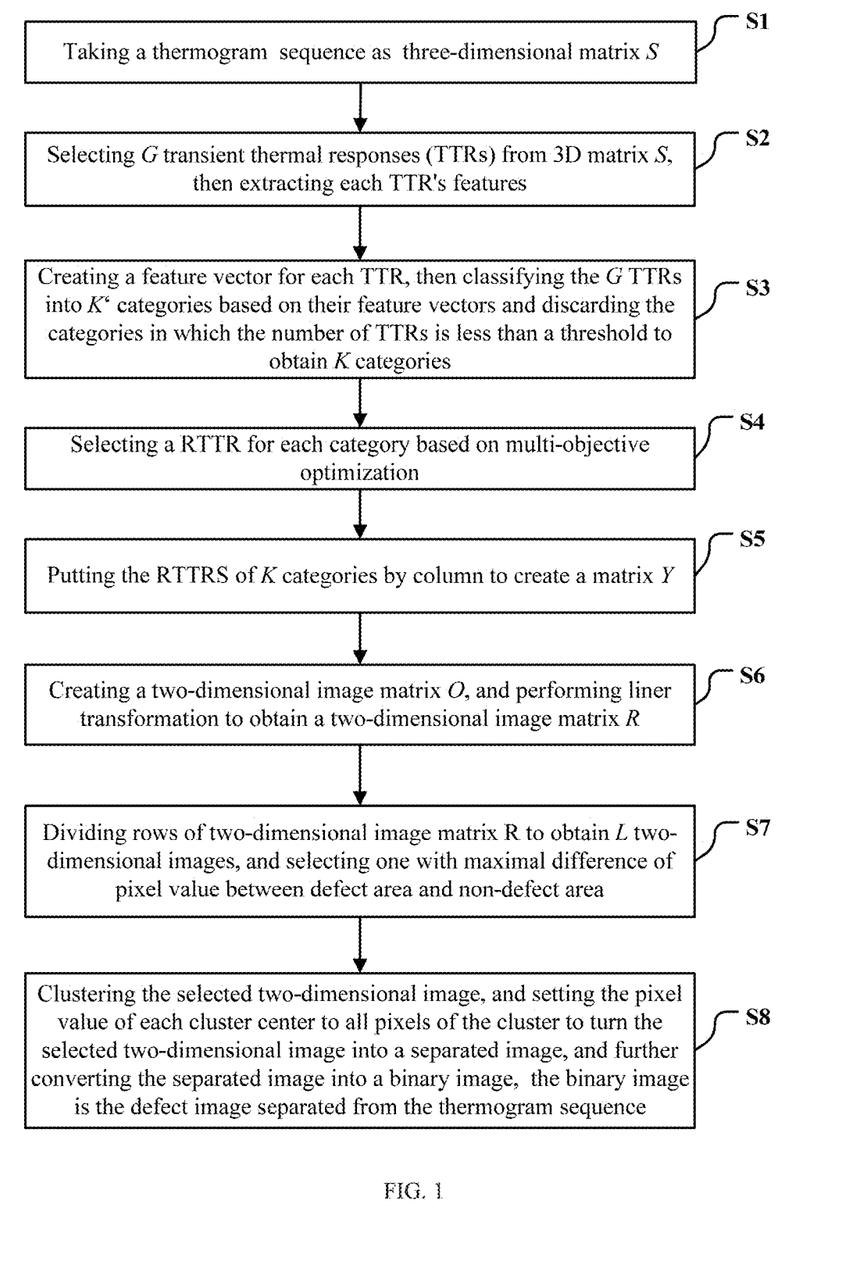
FIG. 1 is a flow diagram of a method for separating out a defect image from a thermogram sequence based on weighted naive Bayesian classifier and dynamic multi-objective optimization in accordance with the present invention.

FIG. 1 is a flow diagram of a method for separating out a defect image from a thermogram sequence based on weighted naive Bayesian classifier and dynamic multi-objective optimization in accordance with the present invention.

Figure 2:
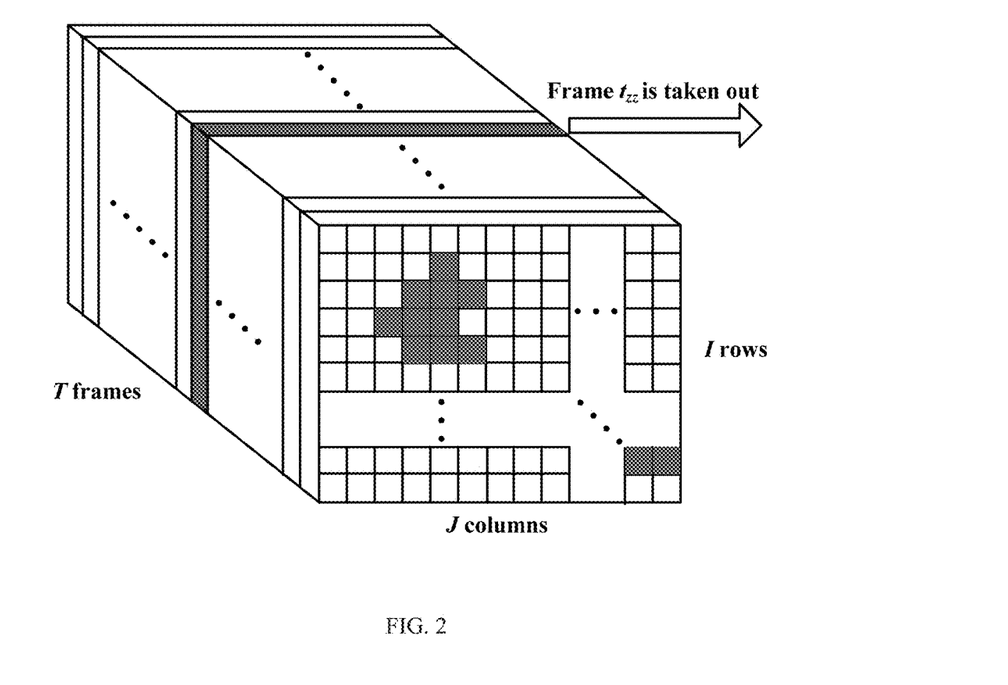
FIG. 2 is a diagram of a 3D matrix in accordance with one embodiment of present invention.

In one embodiment, as shown in FIG. 1, the method for separating out a defect image from a thermogram sequence based on weighted naive Bayesian classifier and dynamic multi-objective optimization is provided, comprising:

Step S1: taking a thermogram sequence, recorded by an infrared thermal imaging camera, as a three-dimensional (3D) matrix S, where an element S(i,j,t) of the 3D matrix S is a pixel value of row i and column j of the thermogram sequence's frame t. As shown in FIG. 2, each frame has I rows and J columns, and the 3D matrix S has T frames.

Step S2: selecting G transient thermal responses (TTRs) from 3D matrix S, then extracting each TTR's features: $E^g$, $V_{up}^g$, $V_{down}^g$, $T_{max}^g$, $T_{ave}^g$;

where $E^g$ is the TTR's energy, and calculated according to the following equation:

$$E^g = x_{g,1}^2 + x_{g,2}^2 + \ldots + x_{g,T}^2$$

g is the serial number of the TTR, g=1, 2, ..., G, $x_{g,t}$ is the pixel value (temperature value) of TTR g at frame t, t represents 1, 2, ..., T, T is the number of frames of the thermogram sequence;

where $V_{up}^g$ is the TTR's temperature change rate during endothermic process, and calculated according to the following equation:

$$V_{up}^g = \frac{x_{g,t_{mid}} - x_{g,t_0}}{t_{mid} - t_0}$$

$t_{mid}$ is the serial number of the last heating frame, $x_{g,t_{mid}}$ is the pixel value (temperature value) of TTR g at frame $t_{mid}$, $t_0$ is the serial number of the first heating frame, $x_{g,t_0}$ to is the pixel value (temperature value) of TTR g at frame $t_0$;

where $v_{down}^g$ is the TTR's temperature change rate during endothermic process, and calculated according to the following equation:

$$V_{down}^g = \frac{x_{g,t_{mid}} - x_{g,t_{end}}}{t_{end} - t_{mid}}$$

$t_{end}$ is the serial number of the last heat releasing frame, $x_{g,t_{end}}$ is the pixel value (temperature value) of TTR g at frame $t_{end}$;

where $T_{ave}^g$ is the TTR's average temperature, and calculated according to the following equation:

$$T_{ave}^g = \frac{x_{g,1} + x_{g,2} + \ldots + x_{g,T}}{T}$$

where $T_{max}^g$ is the TTR's maximum temperature, and calculated according to the following equation:

$$T_{max}^g = \max(x_{g,1}, x_{g,2}, \ldots, x_{g,T});$$

In one embodiment, the selecting G transient thermal responses (TTRs) from 3D matrix S further comprises:

Step S201: selecting a pixel value $S(i_{zz}, j_{zz}, t_{zz})$ from 3D matrix S, where the pixel value $S(i_{zz}, j_{zz}, t_{zz})$ is the maximal pixel value at row $i_{zz}$ and column $j_{zz}$ and satisfies the following equation:

$$\max\left(S(i_{zz}, j_{zz}, t_{zz}) \frac{S(i_{zz}, j_{zz}, t_{mid}) - S(i_{zz}, j_{zz}, t_0)}{t_{mid} - t_0}\right)$$

$t_{mid}$ is the serial number of the last heating frame, $t_0$ is the serial number of the first heating frame.

Figure 3:
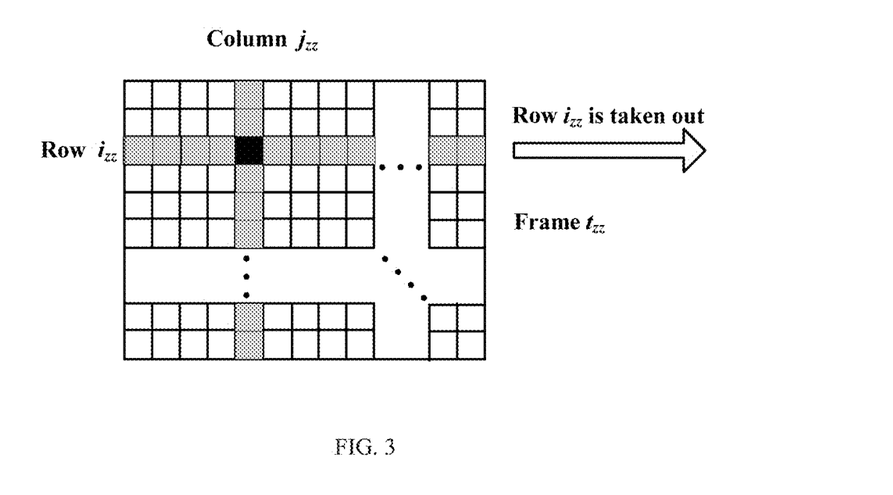
FIG. 3 is a diagram of a frame which has pixel value $S(i_{zz},j_{zz},t_{zz})$ in accordance with one embodiment of present invention.

As shown in FIG. 2, the frame $T_{zz}$ is taken out from the 3D matrix S. As shown in FIG. 3, the frame $T_{zz}$ has the pixel value $S(i_{zz}, j_{zz}, t_{zz})$ satisfied with the equation at row $i_{zz}$ and column $j_{zz}$.

Step S202: selecting column $j_{zz}$ of frame $t_{zz}$ from 3D matrix S, and choosing jumping points according to pixel value's variation of column $j_{zz}$ of frame $t_{zz}$, where a jumping point is located between two adjacent pixels which pixel value's difference is greater than a threshold, and the number of jumping points is P, there has P jumping points, then dividing 3D matrix S into P+1 row data blocks by rows which the P jumping points belong to;

selecting the maximal pixel value $S^p(i_{zz}^p, j_{zz}^p, t_{zz}^p)$ from the $p^{th}$ row data block denoted by $S^p$, p=1, 2, ..., P+1, where $i_{zz}^p$, $j_{zz}^p$, and $t_{zz}^p$ are respectively the row number, column number and frame number of the pixel which has the maximal pixel value, thus the TTR corresponding to the maximal pixel value $S^p(i_{zz}^p, j_{zz}^p, t_{zz}^p)$ is $S^p(i_{zz}^p, j_{zz}^p, t)$, t=1, 2, ..., T;

setting the temperature threshold of $p^{th}$ row data block to $THRE^p$, then calculating the correlation $Re^b$ between TTR $S^p(i_{zz}^p, j_{zz}^p, t)$ and TTR $S^p(i_{zz}^p \pm b, j_{zz}^p, t)$, where pixel interval b is set to 1, 2, ..., in order, meanwhile, judging the correlation $Re^b$: when the correlation $Re^b$ is smaller than $THRE^p$, stopping the calculation of the correlation $Re^b$, where pixel interval b is the step length $CL^p$ of the row data block $S^p$;

Step S203: selecting row $i_{zz}$ of frame $t_{zz}$ from 3D matrix S, and choosing jumping points according to pixel value's variation of row $i_{zz}$ of frame $t_{zz}$, where a jumping point is located between two adjacent pixels which pixel value's difference is greater than a threshold, and the number of jumping point is Q, there has Q jumping points, then dividing 3D matrix S into Q+1 column data blocks by columns which the Q jumping points belong to;

selecting the maximal pixel value $S^q(i_{zz}^q, j_{zz}^q, t_{zz}^q)$ from the $q^{th}$ column data block $S^q$, q=1, 2, ..., Q+1, where $i_{zz}^q$, $j_{zz}^q$, and $t_{zz}^q$ are respectively the row number, column number and frame number of the pixel which has the maximal pixel value, thus the TTR corresponding to the maximal pixel value $S^q(i_{zz}^q, j_{zz}^q, t_{zz}^q)$ is $S^q(i_{zz}^q, j_{zz}^q, t_{zz}^q)$, t=1, 2, ..., T;

setting the temperature threshold of $q^{th}$ row data block to $THRE^q$, then calculating the correlation $Re^d$ between TTR $S^q(i_{zz}^q, j_{zz}^q, t_{zz}^q)$ and TTR $S^q(i_{zz}^q, j_{zz}^q \pm d, t)$, where pixel interval d is set to 1, 2, ..., in order, meanwhile, judging the correlation $Re^d$: when the correlation $Re^d$ is smaller than $THRE^d$, stopping the calculation of the correlation $Re^d$, where pixel interval d is the step length $CL^p$ of the column data block $S^q$.

Figure 4:
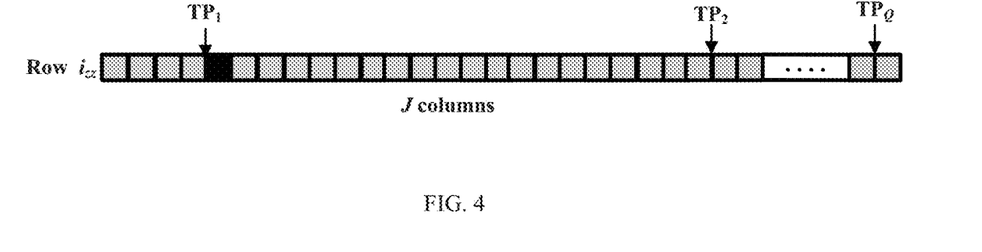
FIG. 4 is a diagram of a row that pixel value $S(i_{zz},j_{zz},t_{zz})$ is at in accordance with one embodiment of present invention.
Figure 5:
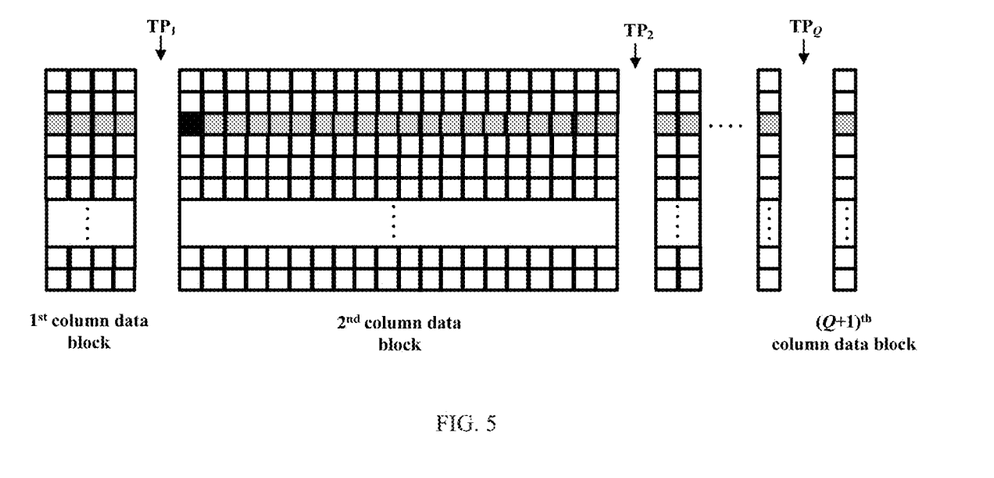
FIG. 5 is a diagram of dividing a 3D matrix S into Q+1 column data blocks in accordance with one embodiment of present invention.
Figure 6:
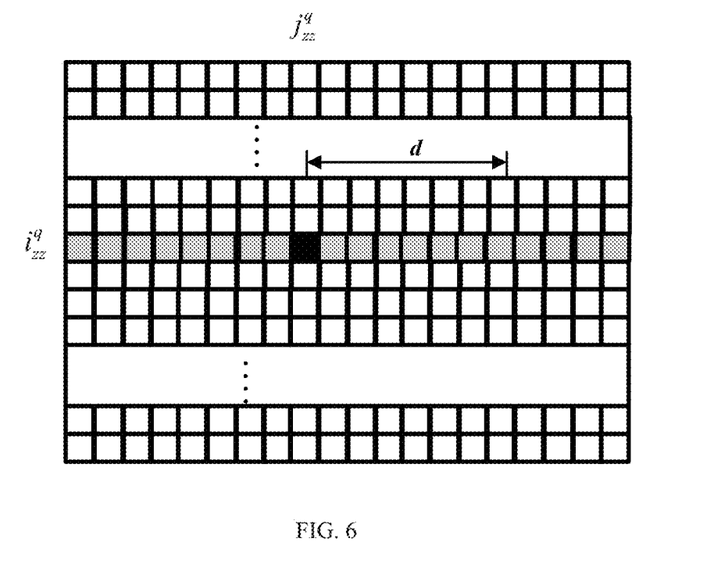
FIG. 6 is a diagram of step length of column data block in accordance with one embodiment of present invention.

In the embodiment, the column data blocks is taken as a example. As shown in FIG. 3, row $i_{zz}$ of frame $t_{zz}$ is taken out from the 3D matrix S. As shown in FIG. 4, Q jumping points are chosen according to pixel value's variation of row $i_{zz}$ of frame $t_{zz}$, where a jumping point is located between two adjacent pixels which pixel value's difference is greater than a threshold. As shown in FIG. 5, the 3D matrix S is divided into Q+1 column data blocks by columns which the Q jumping points belong to. As shown in FIG. 6, d is the step length $CL^p$ of the $q^{th}$ column data block $S^q$, when the correlation $Re^d$ is smaller than temperature threshold $THRE^d$.

Figure 7:
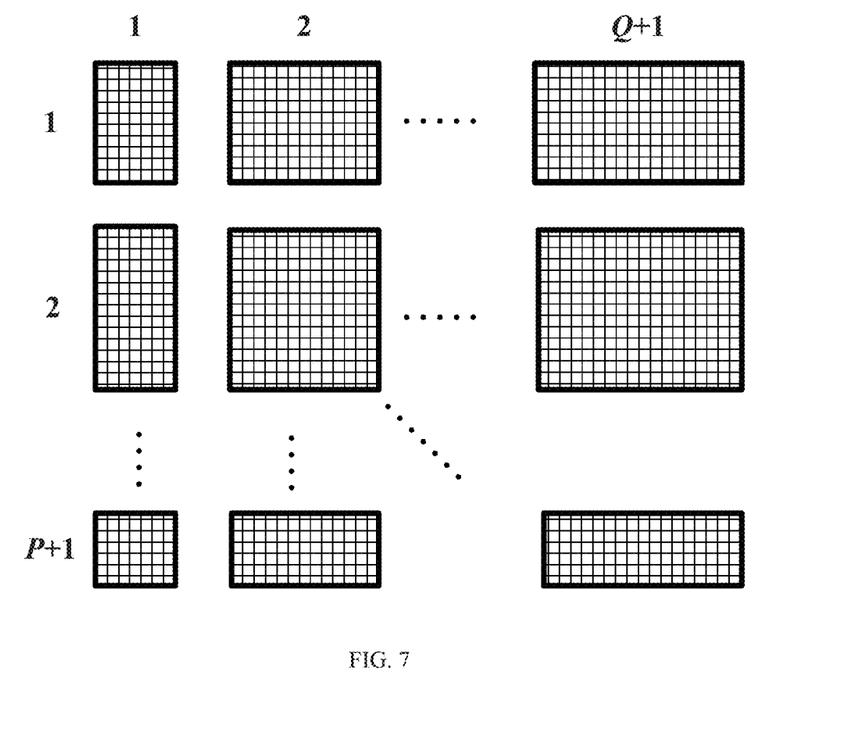
FIG. 7 is a diagram of dividing a 3D matrix S into (P+1)×(Q+1) data blocks in accordance with one embodiment of present invention.
Figure 8:
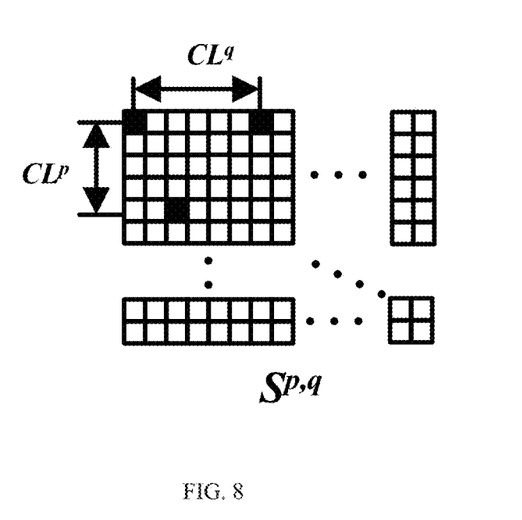
FIG. 8 is a diagram of TTRs selected from a data block in accordance with one embodiment of present invention.

Step S204: dividing the 3D matrix S into (P+1)×(Q+1) data blocks by the rows which the P jumping points belong to and by columns which the Q jumping points belong to, where the data block at $p^{th}$ by row and $q^{th}$ by column is $S^{p,q}$. As shown in FIG. 7, (P+1)×(Q+1) data blocks is obtained;

Step S205: for each data block $S^{p,q}$, setting a threshold DD and initializing set number g=1 and pixel location i=1, j=1, then storing the TTR $S(i_{zz},j_{zz},t)$ t=1, 2, . . . , T in set X(g), calculating the correlation $Re_{i,j}$ between set X(g) and the TTR $S^{p,q}(i,j,t)$, t=1, 2, . . . , T at $i^{th}$ row, $j^{th}$ column, and judging: if $Re_{i,j}$<DD, then g=g+1, and storing the TTR $S^{p,q}(i,j,t)$, t=1, 2, . . . , T in set X(g), otherwise i=i+$CL^p$, and continuing to calculate the correlation $Re_{i,j}$ between set X(g) and the TTR $S^{p,q}(i,j,t)$, t=1, 2, . . . , T at $i^{th}$ row, $j^{th}$ column and judge, where if i>$M^{p,q}$, then i=i–$M^{p,q}$, j=j+$CL^q$, if j>$N^{p,q}$, then terminating the calculation and judgment, each set X(g) is a selected TTR, $M^{p,q}$, $N^{p,q}$ are respectively the number of rows and the number of columns of data block $S^{p,q}$. As shown in FIG. 8, the TTRs corresponding to the black boxes are TTRs selected from the data block $S^{p,q}$, which are judged and selected by step length $CL^p$, $CL^q$.

putting selected TTRs of all data blocks together to obtain the G transient thermal responses, the selection of G transient thermal responses (TTRs) from the 3D matrix S is finished. In one embodiment, 240 TTRs is obtained.

Step S3: creating a feature vector for each TTR, where the feature vector is denoted by $X_g=(E^g,V_{up}^g,V_{down}^g,T_{ave}^g,T_{max}^g)$ g=1, 2, . . . , G, then discretizing the elements of feature vector $X_g$, where the discrete value of $E^g$ is denoted by $E_1$, $E_2$, $E_3$ or $E_4$ according to the value of $E^g$, the discrete value of $V_{up}^g$ is denoted by $V_{up1}$, $V_{up2}$, $V_{up3}$ or $V_{up4}$ according to the value of $V_{up}^g$, the discrete value of $V_{down}^g$ is denoted by $V_{down1}$, $V_{down2}$, $V_{down3}$ or $V_{down4}$ according to the value of $V_{down}^g$, the discrete value of $T_{ave}^g$ is denoted by $T_{ave1}$, $T_{ave1}$, $T_{ave3}$ or $T_{ave4}$ according to the value of $T_{ave}^g$, the discrete value of $T_{max}^g$ is denoted by $T_{max1}$, $T_{max2}$, $T_{max3}$ or $T_{max4}$ according to the value of $T_{max}^g$;

then classifying the G TTRs into K' categories based on their feature vectors through a weighted naive Bayesian classifier, where the weighted naive Bayesian classifier is:

$$h_{nb}(X_g) = \arg\max_{c_k \in C} p(c_k)p(X_g \mid c_k)$$

$c_k$ is the $k^{th}$ category of the G TTRs, C is a class set and denoted by C=($c_1$, $c_2$, . . . , $c_{K'}$), $h_{nb}(X_g)$ is the category of the $g^{th}$ TTR classified by its feature vector $X_g$, i.e. category $c_k$ which has the maximal value of $p(c_k)p(X_g \mid c_k)$ is the category of the $g^{th}$ TTR;

where $p(c_k)$ is the prior probability of category $c_k$, and its value is:

$$p(c_k) = \frac{N_{c_k}}{N_{total}}$$

$N_{total}$ is the number of historic TTRs used for training, $N_{c_k}$ is the number of the TTRs which belong to category $c_k$ among the historic TTRs;

where $p(X_g \mid c_k)$ is the likelihood probability that the $g^{th}$ TTR belongs to category $c_k$, and its value is:

$$p(X_g \mid c_k) = p(E^g \mid c_k)^{w_E} \cdot p(V_{up}^g \mid c_k)^{w_{V_{up}}} \cdot p(V_{down}^g \mid c_k)^{w_{V_{down}}} \cdot p(T_{ave}^g \mid c_k)^{w_{T_{ave}}} \cdot p(T_{max}^g \mid c_k)^{w_{T_{max}}}$$

the weights $w_E$, $w_{V_{up}}$, $w_{V_{down}}$, $w_{T_{ave}}$, $w_{T_{max}}$ are:

$$w_E = \frac{\frac{N_{E_1}}{N_{total}} \cdot KL(C \mid E_1) + \frac{N_{E_2}}{N_{total}} \cdot KL(C \mid E_2) + \frac{N_{E_3}}{N_{total}} \cdot KL(C \mid E_3) + \frac{N_{E_4}}{N_{total}} \cdot KL(C \mid E_4)}{Z}$$

$$w_{V_{up}} = \frac{\frac{N_{V_{up1}}}{N_{total}} \cdot KL(C \mid V_{up1}) + \frac{N_{V_{up2}}}{N_{total}} \cdot KL(C \mid V_{up2}) + \frac{N_{V_{up3}}}{N_{total}} \cdot KL(C \mid V_{up3}) + \frac{N_{V_{up4}}}{N_{total}} \cdot KL(C \mid V_{up4})}{Z}$$

$$w_{V_{down}} = \frac{\frac{N_{V_{down1}}}{N_{total}} \cdot KL(C \mid V_{down1}) + \frac{N_{V_{down2}}}{N_{total}} \cdot KL(C \mid V_{down2}) + \frac{N_{V_{down3}}}{N_{total}} \cdot KL(C \mid V_{down3}) + \frac{N_{V_{down4}}}{N_{total}} \cdot KL(C \mid V_{down4})}{Z}$$

$$w_{T_{ave}} = \frac{\frac{N_{T_{ave1}}}{N_{total}} \cdot KL(C \mid T_{ave1}) + \frac{N_{T_{ave2}}}{N_{total}} \cdot KL(C \mid T_{ave2}) + \frac{N_{T_{ave3}}}{N_{total}} \cdot KL(C \mid T_{ave3}) + \frac{N_{T_{ave4}}}{N_{total}} \cdot KL(C \mid T_{ave4})}{Z}$$

$$w_{T_{max}} = \frac{\left(\frac{N_{T_{max1}}}{N_{total}} \cdot KL(C \mid T_{max1}) + \frac{N_{T_{max2}}}{N_{total}} \cdot KL(C \mid T_{max2}) + \frac{N_{T_{max3}}}{N_{total}} \cdot KL(C \mid T_{max3}) + \frac{N_{T_{max4}}}{N_{total}} \cdot KL(C \mid T_{max4})\right)}{(Z)}$$

where $$Z = \sum_{h=1}^{4} \left( \begin{array}{c} N_{E_h}KL(C \mid E_h) + N_{V_{uph}}KL(C \mid V_{uph}) + \\ N_{V_{downh}}KL(C \mid V_{downh}) + \\ N_{T_{aveh}}KL(C \mid T_{aveh}) + N_{T_{maxh}}KL(C \mid T_{maxh}) \end{array} \right) \Big/ 5N_{total}$$

where $$KL(C \mid E_h) = \sum_{k=1}^{K} p(c_k \mid E_h)\log\left(\frac{p(c_k \mid E_h)}{p(c_k)}\right)$$

$$KL(C \mid V_{uph}) = \sum_{k=1}^{K} p(c_k \mid V_{uph})\log\left(\frac{p(c_k \mid V_{uph})}{p(c_k)}\right)$$

$$KL(C \mid V_{downh}) = \sum_{k=1}^{K} p(c_k \mid V_{downh})\log\left(\frac{p(c_k \mid V_{downh})}{p(c_k)}\right)$$

Figure 9:
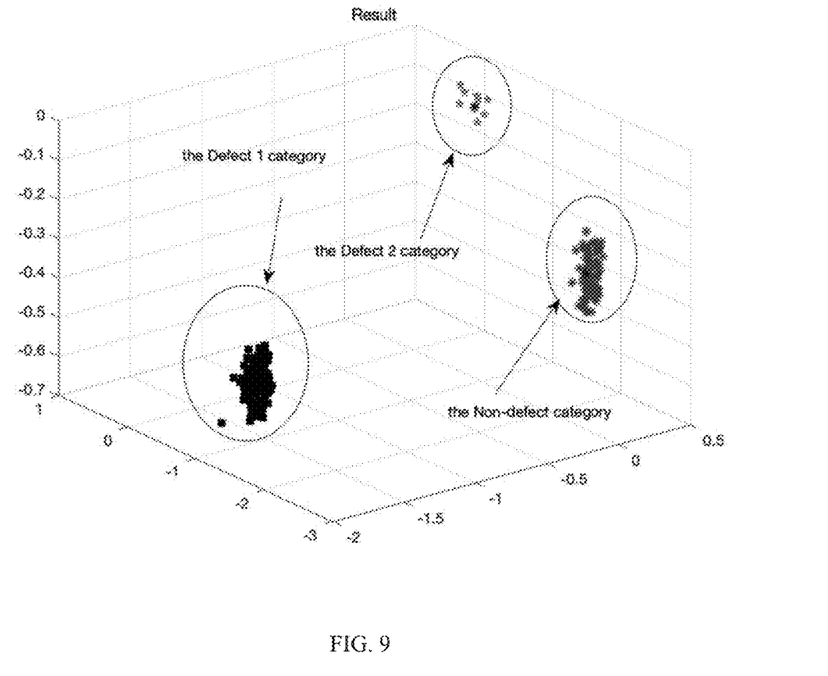
FIG. 9 is a diagram of being clustered into 3 clusters in accordance with one embodiment of present invention.

-continued $$KL(C|T_{aveh}) = \sum_{k=1}^{K} p(c_k|T_{aveh})\log\left(\frac{p(c_k|T_{aveh})}{p(c_k)}\right)$$

$$KL(C|T_{maxh}) = \sum_{k=1}^{K} p(c_k|T_{maxh})\log\left(\frac{p(c_k|T_{maxh})}{p(c_k)}\right)$$

where $N_{E_1}$, $N_{E_2}$, $N_{E_3}$ and $N_{E_4}$ are respectively the number of the TTRs of discrete value $E_1$, the number of the TTRs of discrete value $E_2$, the number of the TTRs of discrete value $E_3$ and the number of the TTRs of discrete value $E_4$ among the historic TTRs; $N_{V_{up1}}$, $N_{V_{up2}}$, $N_{V_{up3}}$ and $N_{V_{up4}}$ are respectively the number of the TTRs of discrete value $V_{up1}$, the number of the TTRs of discrete value $V_{up2}$, the number of the TTRs of discrete value $V_{up3}$ and the number of the TTRs of discrete value $V_{up4}$ among the historic TTRs; $N_{V_{down1}}$, $N_{V_{down2}}$, $N_{V_{down3}}$ and $N_{V_{down4}}$ are respectively the number of the TTRs of discrete value $V_{down1}$, the number of the TTRs of discrete value $V_{down2}$, the number of the TTRs of discrete value $V_{down3}$ and the number of the TTRs of discrete value $V_{down4}$ among the historic TTRs; $N_{T_{ave1}}$, $N_{T_{ave2}}$, $N_{T_{ave3}}$ and $N_{T_{ave4}}$ are respectively the number of the TTRs of discrete value $T_{ave1}$, the number of the TTRs of discrete value $T_{ave1}$, the number of the TTRs of discrete value $T_{ave3}$ and the number of the TTRs of discrete value $T_{ave4}$ among the historic TTRs; $N_{T_{max1}}$, $N_{T_{max2}}$, $N_{T_{max3}}$ and $N_{T_{max4}}$ are respectively the number of the TTRs of discrete value $T_{max1}$, the number of the TTRs of discrete value $T_{max2}$, the number of the TTRs of discrete value $T_{max3}$ and the number of the TTRs of discrete value $T_{max4}$ among the historic TTRs; where h is the serial number of discrete value, KL is Kullback-Leibler divergence operation, $p(c_k|E_h)$, $p(c_k|V_{uph})$, $p(c_k|V_{downh})$, $p(c_k|T_{aveh})$ and $p(c_k|T_{max\_h})$ are respectively the posterior probability that discrete value $E_h$ belongs to category $c_k$, the posterior probability that discrete value $V_{uph}$ belongs to category $c_k$, the posterior probability that discrete value $V_{downh}$ belongs to category $c_k$, the posterior probability that discrete value $T_{aveh}$ belongs to category $c_k$ and discrete value $T_{max\_h}$ belongs to category $c_k$;

then discarding the categories in which the number of TTRs is less than a threshold to obtain K categories;

In one embodiment, the features of 240 TTRs is classified into 20 categories, and after discarding, 3 categories are obtained, which include a non-defect category and two different defect categories. The result is shown in FIG. 9, there are 83 TTRs in non-defect category 142 TTRs in defect 1 category and 9 TTRs in defect 2 category.

Step S4: selecting a RTTR (Representative Transient Thermal Response) for each category based on feature vector through dynamic multi-objective optimization, where the multi-objective function is:

$$\text{minimize} F(_iX) = (f_1(_iX), \ldots f_K(_iX))^T$$

$_iX$ is a feature vector of a TTR selected from category i', $_iX=(_iE, _iV_{up}, _iV_{down})$, $_iE$ is the normalized energy value of the TTR, $_iV_{up}$ is the normalized temperature change rate of the TTR during endothermic process, $_iV_{down}$ is the normalized temperature change rate of the TTR during endothermic process, the center of feature vectors of category i' is denoted by $_iX_{center}=(_iE_{Center}, _iV_{up\_Center}, _iV_{down\_Center})$;

$f_k(_iX)$ is the Euclidean distance between feature vector $_iX$ and center $_iX_{center}$, and can be calculated according to the following equation:

$$f_1(_{i'}X) = \min\sqrt{(_{i'}\overline{E} - _{i'}\overline{E}_{Center})^2 + (_{i'}\overline{V}_{up} - _{i'}\overline{V}_{up\_Center})^2 + (_{i'}\overline{V}_{down} - _{i'}\overline{V}_{down\_Center})^2}$$

$f_k(_iX)$, k=2, 3, ..., K are renumbered Euclidean distances $f_{i'j'}(_iX)$ between feature vector $_iX$ and center $_iX_{center}$ of feature vectors of category j', j'≠i', $_{j'}X_{center}=(_{j'}\overline{E}_{Center}, _{j'}\overline{V}_{up\_Center}, _{j'}\overline{V}_{down\_Center})$ and can be calculated according to the following equation:

$$f_{i'j' \atop j'\neq i'}(_{i'}X) = \min\left(-\sqrt{\begin{array}{c}(_{i'}\overline{E} - _{j'}\overline{E}_{Center})^2 + (_{i'}\overline{V}_{up} - _{j'}\overline{V}_{up\_Center})^2 + \\ (_{i'}\overline{V}_{down} - _{j'}\overline{V}_{down\_Center})^2\end{array}}\right)$$

In one embodiment, the initial TTR population corresponding to the approximate solution for multi-objective optimization is chosen according to the two TTR populations respectively corresponding to the two approximate solutions of previous two defect image separations by the following steps:

Step A: randomly selecting $N_E$ feature vectors from TTR population set $_{i'}^{-1}PS$ to form a TTR set $_{i'}^{-1}PS'$, which is denoted by $_{i'}^{-1}PS'=(_{i'}^{-1}X'^1, _{i'}^{-1}X'^2, \ldots, _{i'}^{-1}X'^{N_E})$, randomly selecting $N_E$ feature vectors from TTR population set $_{i'}^{-2}PS$ to form a TTR set $_{i'}^{-2}PS'$, where −1 represents the last defect image separation, −2 represents the second-to-last defect image separation, the TTR population set $_{i'}^{-1}PS$ corresponds to the approximate solutions of category i' of the last defect image separation, the TTR population set $_{i'}^{-2}PS$ corresponds to the approximate solutions of category i' of the second-to-last defect image separation;

marking the feature vector in TTR population set $_{i'}^{-2}PS'$ which is closest to the $n^{th}$ feature vector in TTR population set $_{i'}^{-1}PS'$ as $_{i'}^{-2}X'^m$, where TTR population set $_{i'}^{-2}PS$ is denoted by $_{i'}^{-2}PS'=(_{i'}^{-2}X'^1, _{i'}^{-2}X'^2, \ldots, _{i'}^{-2}X'^{N_E})$;

then calculating the number W of typical individuals in TTR set $_{i'}^{-1}PS'$:

$$W = [W_1 + _{i'}^{-1}\delta \times (W_2 - W_1)]$$

where $W_1$ and $W_2$ are respectively the lower limit value and the upper limit value of W, and $W_1=K+1$, $W_2=3K$, $_{i'}^{-1}\delta$ is estimate of environment change of last defect image separation and obtained according to the following equations:

$$_{i'}^{-1}\delta = \frac{\sum_{n'=1}^{N_E} \sqrt{\sum_{k=1}^{K} [f_k(_{i'}^{-1}X'^{m'}) - f_k(_{i'}^{-2}X'^{m'})]^2}}{N_E \times K}$$

$f_k(_{i'}^{-1}X'^{m'})$ is a $f_k(_iX)$ into which feature vector $_{i'}^{-1}X'^{m'}$ as feature vector $_iX$ is plugged, $f_k(_{i'}^{-2}X'^{m'})$ is a $f_k(_iX)$ into which feature vector $_{i'}^{-2}X'^{m'}$ as feature vector $_iX$ is plugged;

Step B: creating a multi-directional prediction set $_{i'}^{-1}C$, which includes two parts, where the first part is the center of all feature vectors in TTR population set $_{i'}^{-1}PS$ and can be denote by $_{i'}^{-1}XC^1$:

$$_{i'}^{-1}XC^1 = \frac{1}{_{i'}^{-1}N_{PS}} \sum_{n=1}^{_{i'}^{-1}N_{PS}} {_{i'}^{-1}X^n}$$

$_{i'}^{-1}X^n$ is the $n^{th}$ feature vector in TTR population set $_{i'}^{-1}PS$, $_{i'}^{-1}N_{PS}$ is the number of feature vectors in TTR population set $_{i'}^{-1}PS$;

the second part is K extreme solutions of Pareto optimal front, and can be denote by:

$$_{i'}^{-1}XC^2, \ldots, _{i'}^{-1}XC^{N_C}$$

$N_C$ is the number of feature vectors in multi-directional prediction set $_{i'}^{-1}C$, $N_C = K+1$;

Step C: calculating the Euclidean distance $_{i'}^{-1}D^{nw} = \|_{i'}^{-1}X^n - _{i'}^{-1}XC^w\|_2$ of the $n^{th}$ feature vector $_{i'}^{-1}X^n$, $_{i'}^{-1}X^n$, $n=1, 2, \ldots, _{i'}^{-1}N_{PS}$ from each feature vector $_{i'}^{-1}XC^w$, $w=1, 2, \ldots, N_C$, and putting the $n^{th}$ feature vector $_{i'}^{-1}X^n$ into a cluster set which is corresponding to the feature vector having minimal distance in multi-directional prediction set $_{i'}^{-1}C$, thus TTR population set $_{i'}^{-1}PS$ is clustered into $N_C$ cluster sets which is denoted by $_{i'}^{-1}Cluster[w]$, $w=1, 2, \ldots, N_C$;

Step D: If $N_C = W$, outputting multi-directional prediction set $_{i'}^{-1}C$ and the $N_C$ cluster sets; otherwise adding a feature vector $_{i'}^{-1}XC^{N_c+1}$ to multi-directional prediction set $_{i'}^{-1}C$, then updating $N_C$ with $N_C = N_C + 1$ and returning to Step C, where feature vector $_{i'}^{-1}XC^{N_{ps}+1}$ is obtained through the following equation:

$$_{i'}^{-1}XC^{N_{ps}+1} = \arg\max_{_{i'}^{-1}X^w} \max_l \|_{i'}^{-1}X^w_l - _{i'}^{-1}XC^w\|$$

$_{i'}^{-1}X^w_l$ is the $l^{th}$ feature vector of $_{i'}^{-1}Cluster[w]$, i.e. feature vector $_{i'}^{-1}XC^{N_c+1}$ is a feature vector selected from the $N_C$ cluster sets which distance from its cluster center is maximal;

Step E: calculating a prediction direction $\Delta_{i'}^{-1}C = \{\Delta_{i'}^{-1}c^1, \Delta_{i'}^{-1}c^2, \ldots, \Delta_{i'}^{-1}c^W\}$:

$$\Delta_{i'}^{-1}c^w = _{i'}^{-1}XC^w - _{i'}^{-2}XC^{w'}, w=1,2,\ldots,W$$

where $_{i'}^{-2}XC^{w'}$ is a feature vector in multi-directional prediction set $_{i'}^{-2}C$ of the second-to-last defect image separation which is closest to feature vector $_{i'}^{-1}XC^w$;

Step F: initializing the size of the initial TTR population corresponding to the approximate solution to $N_P$, where $N_P$ is greater than $N_E$;

then creating $N_E$ feature vectors, where the $n^{th}$ feature vector of the $N_E$ feature vectors is:

$$_iX^{n'}(0) = _{i'}^{-1}X^{n'} + \Delta_{i'}^{-1}c^{w_{n'}} + _{i'}^{-1}\varepsilon^{w_{n'}}, n=1,2,\ldots,N_E$$

0 represents initial value of iteration of the dynamic multi-objective optimization, $w_{n'}$ is the serial number of the cluster set to which feature vector $_{i'}^{-1}X^{n'}$ belongs, $\rightarrow_{i'}^{-1}c^{w_{n'}}$ is the $w_{n'}^{th}$ element in the prediction direction $\Delta_{i'}^{-1}C$, $_{i'}^{-1}\varepsilon^{w_{n'}}$ is a random number which obeys a normal distribution, the mean of the normal distribution is 0, the variance of the normal distribution is:

$$_{i'}^{-1}\sigma = \frac{1}{W}\sum_{w=1}^{W}|\Delta_{i'}^{-1}c^w|$$

randomly creating $N_P - N_E$ feature vectors;

combining the $N_E$ feature vectors and the $N_P - N_E$ feature vectors to form the initial TTR population corresponding to the approximate solution for multi-objective optimization.

In the embodiment, the previous TTR population provides a direction for the creation of the initial TTR population corresponding to the approximate solution, which makes the multi-objective optimization dynamic and reduces its time consumption.

Figure 10:
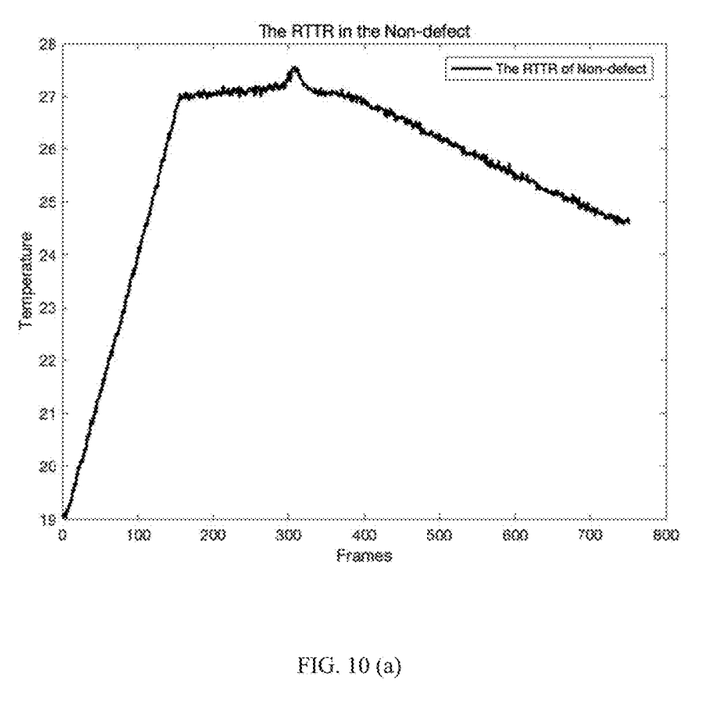

In one embodiment, as shown in FIG. 10, (a) is the RTTR of non-defect cluster, (b) is the RTTR of defect 1 cluster, (c) is the RTTR of defect 2 cluster.

Step S5: putting the RTTRs of K categories by column to create a matrix Y, where a column is a RTTR, which contains T pixel values of the RTTR, the matrix Y is a matrix with size of T×K;

Step S6: linking the back column to the front column from the first column for each frame of 3D matrix S to obtain T columns of pixels, putting the T columns of pixels by frame order to create a two-dimensional image matrix O with I×J rows and T columns, then performing liner transformation to matrix Y with two-dimensional image matrix O: $R = Y^{-1} * O^T$ to obtain a two-dimensional image matrix R, where $Y^{-1}$ is the pseudo-inverse matrix of matrix Y with size of K×T, $O^T$ is the transpose matrix of two-dimensional image matrix O, two-dimensional image matrix R has K rows and I×J columns;

Step S7: dividing a row of two-dimensional image matrix R into I rows by column size of J, and putting the I rows together by order to obtain a two-dimensional image with size of I×J, where two-dimensional image matrix R has K rows, thus K two-dimensional images are obtained, selecting a two-dimensional image which has maximal difference of pixel value between defect area and non-defect area from the K two-dimensional images;

Step S8: using Fuzzy C-Mean algorithm to cluster the selected two-dimensional image: obtaining each pixel's cluster according to pixel's maximal membership, then setting the pixel value of each cluster center to all pixels of the cluster which the cluster center belongs to, where the selected two-dimensional image is turned into a separated image, and converting the separated image into a binary image, where the binary image is the defect image separated from the thermogram sequence.

Figure 11:
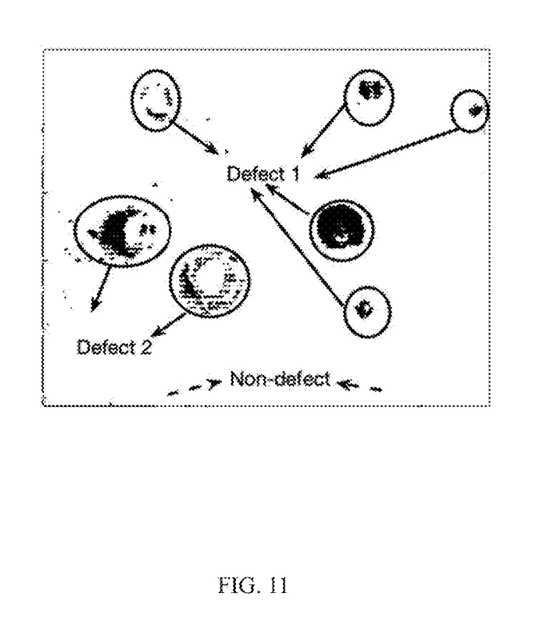
FIG. 11 is a diagram of a defect image separated from a thermogram sequence in accordance with one embodiment of present invention.

In one embodiment, as shown in FIG. 11, a defect image is separated from a thermogram sequence, there has two kind of defect, i.e. defect 1 and defect 2.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for separating out a defect image from a thermogram sequence based on weighted naive Bayesian classifier and dynamic multi-objective optimization, comprising:

(1): taking a thermogram sequence, recorded by an infrared thermal imaging camera, as a three-dimensional (3D) matrix denoted by S, where an element S(i,j,t) of 3D matrix S is a pixel value of row i and column j of the thermogram sequence's frame t, each frame has I rows and J columns;

(2): selecting G transient thermal responses (TTRs) from 3D matrix S, then extracting each TTR's features: $E^g$, $V_{up}^g$, $V_{down}^g$, $T_{ave}^g$, $T_{max}^g$;

where $E^g$ is the TTR's energy, and calculated according to the following equation:

$$E^g = x_{g,1}^2 + x_{g,2}^2 + \ldots + x_{g,T}^2$$

g is the serial number of the TTR, $g=1, 2, \ldots, G$, $x_{g,t}$ is the pixel value (temperature value) of TTR g at frame t, t represents 1, 2, ..., T, T is the number of frames of the thermogram sequence;

where $v_{up}^g$ is the TTR's temperature change rate during endothermic process, and calculated according to the following equation:

$$V_{up}^g = \frac{x_{g,t_{mid}} - x_{g,t_0}}{t_{mid} - t_0}$$

$t_{mid}$ is the serial number of the last heating frame, $x_{g,t_{mid}}$ is the pixel value (temperature value) of TTR g at frame $t_{mid}$, $t_0$ is the serial number of the first heating frame, $x_{g,t_0}$ to is the pixel value (temperature value) of TTR g at frame $t_0$;

where $v_{down}^g$ is the TTR's temperature change rate during endothermic process, and calculated according to the following equation:

$$V_{down}^g = \frac{x_{g,t_{mid}} - x_{g,t_{end}}}{t_{end} - t_{mid}}$$

$t_{end}$ is the serial number of the last heat releasing frame, $x_{g,t_{end}}$ to d is the pixel value (temperature value) of TTR g at frame $t_{end}$, where $T_{ave}^g$ is the TTR's average temperature, and calculated according to the following equation:

$$T_{ave}^g = \frac{x_{g,1} + x_{g,2} + \ldots + x_{g,T}}{T}$$

where $T_{max}^g$ is the TTR's maximum temperature, and calculated according to the following equation:

$$T_{max}^g = \max(x_{g,1}, x_{g,2}, \ldots, x_{g,T});$$

(3): creating a feature vector for each TTR, where the feature vector is denoted by $X_g = (E^g, V_{up}^g, V_{down}^g, T_{ave}^g, T_{max}^g)$, $g=1, 2, \ldots, G$;

then discretizing the elements of feature vector $X_g$, where the discrete value of $E^g$ is denoted by $E_1$, $E_2$, $E_3$ or $E_4$ according to the value of $E^g$, the discrete value of $V_{up}^g$ is denoted by $V_{up1}$, $V_{up2}$, $V_{up3}$ or $V_{up4}$ according to the value of $V_{up}^g$, the discrete value of $V_{down}^g$ is denoted by $V_{down1}$, $V_{down2}$, $V_{down3}$ or $V_{down4}$ according to the value of $V_{ave}^g$, the discrete value of $T_{ave}^g$ is denoted by $T_{ave1}$, $T_{ave2}$, $T_{ave3}$ or $T_{ave4}$ according to the value of $T_{ave}^g$, the discrete value of $T_{max}^g$ is denoted by $T_{max1}$, $T_{max2}$, $T_{max3}$ or $T_{max4}$ according to the value of $T_{max}^g$;

then classifying the G TTRs into K' categories based on their feature vectors through a weighted naive Bayesian classifier, where the weighted naive Bayesian classifier is:

$$h_{nb}(X_g) = \underset{c_k \in C}{\operatorname{argmax}} \, p(c_k) p(X_g \mid c_k)$$

$c_k$ is the $k^{th}$ category of the G TTRs, C is a class set and denoted by $C=(c_1, c_2, \ldots, c_{K'})$, $h_{nb}(X_g)$ is the category of the $g^{th}$ TTR classified by its feature vector $X_g$, category $c_k$ which has the maximal value of $p(c_k)p(X_g|c_k)$ is the category of the $g^{th}$ TTR;

where $p(c_k)$ is the prior probability of category $c_k$, and its value is:

$$p(c_k) = \frac{N_{c_k}}{N_{total}}$$

$N_{total}$ is the number of historic TTRs used for training, $N_{c_k}$ is the number of the TTRs which belong to category $c_k$ among the historic TTRs;

where $p(X_g|c_k)$ is the likelihood probability that the $g^{th}$ TTR belongs to category $c_k$, and its value is:

$$p(X_g \mid c_k) = p(E^g \mid c_k)^{w_E} \cdot p(V_{up}^g \mid c_k)^{w_{V_{up}}} \cdot p(V_{down}^g \mid c_k)^{w_{V_{down}}} \cdot p(T_{ave}^g \mid c_k)^{w_{T_{ave}}} \cdot p(T_{max}^g \mid c_k)^{w_{T_{max}}}$$

the weights $w_E$, $w_{V_{up}}$, $w_{V_{down}}$, $w_{T_{ave}}$, $w_{T_{max}}$ are:

$$w_E = \frac{\frac{N_{E_1}}{N_{total}} \cdot KL(C|E_1) + \frac{N_{E_2}}{N_{total}} \cdot KL(C|E_2) + \frac{N_{E_3}}{N_{total}} \cdot KL(C|E_3) + \frac{N_{E_4}}{N_{total}} \cdot KL(C|E_4)}{Z}$$

$$w_{V_{up}} = \frac{\frac{N_{V_{up1}}}{N_{total}} \cdot KL(C|V_{up1}) + \frac{N_{V_{up2}}}{N_{total}} \cdot KL(C|V_{up2}) + \frac{N_{V_{up3}}}{N_{total}} \cdot KL(C|V_{up3}) + \frac{N_{V_{up4}}}{N_{total}} \cdot KL(C|V_{up4})}{Z}$$

$$w_{V_{down}} = \frac{\frac{N_{V_{down1}}}{N_{total}} \cdot KL(C|V_{down1}) + \frac{N_{V_{down2}}}{N_{total}} \cdot KL(C|V_{down2}) + \frac{N_{V_{down3}}}{N_{total}} \cdot KL(C|V_{down3}) + \frac{N_{V_{down4}}}{N_{total}} \cdot KL(C|V_{down4})}{Z}$$

$$w_{T_{ave}} = \frac{\frac{N_{T_{ave1}}}{N_{total}} \cdot KL(C|T_{ave1}) + \frac{N_{T_{ave2}}}{N_{total}} \cdot KL(C|T_{ave2}) + \frac{N_{T_{ave3}}}{N_{total}} \cdot KL(C|T_{ave3}) + \frac{N_{T_{ave4}}}{N_{total}} \cdot KL(C|T_{ave4})}{Z}$$

$$w_{T_{max}} = \frac{\left(\frac{N_{T_{max1}}}{N_{total}} \cdot KL(C|T_{max1}) + \frac{N_{T_{max2}}}{N_{total}} \cdot KL(C|T_{max2}) + \frac{N_{T_{max3}}}{N_{total}} \cdot KL(C|T_{max3}) + \frac{N_{T_{max4}}}{N_{total}} \cdot KL(C|T_{max4})\right)}{(Z)}$$

where $$Z = \sum_{h=1}^{4} \left( \begin{array}{c} N_{E_h} KL(C|E_h) + N_{V_{uph}} KL(C|V_{uph}) + \\ N_{V_{downh}} KL(C|V_{downh}) + \\ N_{T_{aveh}} KL(C|T_{aveh}) + N_{T_{maxh}} KL(C|T_{maxh}) \end{array} \right) \Big/ 5N_{total}$$

where $$KL(C|E_h) = \sum_{k=1}^{K} p(c_k|E_h) \log\left(\frac{p(c_k|E_h)}{p(c_k)}\right)$$

$$KL(C|V_{uph}) = \sum_{k=1}^{K} p(c_k|V_{uph}) \log\left(\frac{p(c_k|V_{uph})}{p(c_k)}\right)$$

$$KL(C|V_{downh}) = \sum_{k=1}^{K} p(c_k|V_{downh}) \log\left(\frac{p(c_k|V_{downh})}{p(c_k)}\right)$$

-continued $$KL(C \mid T_{aveh}) = \sum_{k=1}^{K} p(c_k \mid T_{aveh}) \log\left(\frac{p(c_k \mid T_{aveh})}{p(c_k)}\right)$$

$$KL(C \mid T_{maxh}) = \sum_{k=1}^{K} p(c_k \mid T_{maxh}) \log\left(\frac{p(c_k \mid T_{maxh})}{p(c_k)}\right)$$

where $N_{E_1}$, $N_{E_2}$, $N_{E_3}$ and $N_{E_4}$ are respectively the number of the TTRs of discrete value $E_1$, the number of the TTRs of discrete value $E_2$, the number of the TTRs of discrete value $E_3$ and the number of the TTRs of discrete value $E_4$ among the historic TTRs; $N_{V_{up1}}$, $N_{V_{up2}}$, $N_{V_{up3}}$ and $N_{V_{up4}}$ are respectively the number of the TTRs of discrete value $V_{up1}$, the number of the TTRs of discrete value $V_{up2}$, the number of the TTRs of discrete value $V_{up3}$ and the number of the TTRs of discrete value $V_{up4}$ among the historic TTRs; $N_{V_{down1}}$, $N_{V_{down2}}$, $N_{V_{down3}}$ and $N_{V_{down4}}$ are respectively the number of the TTRs of discrete value $V_{down1}$, the number of the TTRs of discrete value $V_{down2}$, the number of the TTRs of discrete value $V_{down3}$ and the number of the TTRs of discrete value $V_{down4}$ among the historic TTRs; $N_{T_{ave1}}$, $N_{T_{ave2}}$, $N_{T_{ave3}}$ and $N_{T_{ave4}}$ are respectively the number of the TTRs of discrete value $T_{ave1}$, the number of the TTRs of discrete value $T_{ave2}$, the number of the TTRs of discrete value $T_{ave3}$ and the number of the TTRs of discrete value $T_{ave4}$ among the historic TTRs; $N_{T_{max1}}$, $N_{T_{max2}}$, $N_{T_{max3}}$ and $N_{T_{max4}}$ are respectively the number of the TTRs of discrete value $T_{max1}$, the number of the TTRs of discrete value $T_{max2}$, the number of the TTRs of discrete value $T_{max3}$ and the number of the TTRs of discrete value $T_{max4}$ among the historic TTRs;

where h is the serial number of discrete value, KL is Kullback-Leibler divergence operation, $p(c_k|E_h)$, $p(c_k|V_{uph})$, $p(c_k|V_{downh})$, $p(c_k|T_{aveh})$ and $p(c_k|T_{max\ h})$ are respectively the posterior probability that discrete value $E_h$ belongs to category $c_k$, the posterior probability that discrete value, $V_{uph}$ belongs to category $c_k$, the posterior probability that discrete value $V_{downh}$ belongs to category $c_k$, the posterior probability that discrete value $T_{aveh}$ belongs to category $c_k$ and discrete value $T_{max\ h}$ belongs to category $c_k$;

then discarding the categories in which the number of TTRs is less than a threshold to obtain K categories;

(4): selecting a RTTR (Representative Transient Thermal Response) for each category based on feature vector through dynamic multi-objective optimization, where the multi-objective function is:

$$\text{minimize} F(_iX) = (f_1(_iX), \ldots, f_K(_iX))^T$$

$_iX$ is a feature vector of a TTR selected from category i', $_iX=(_i\overline{E},_i\overline{V}_{up},_i\overline{V}_{down})$, $_i\overline{E}$ is the normalized energy value of the TTR, $_i\overline{V}_{up}$ is the normalized temperature change rate of the TTR during endothermic process, $_i\overline{V}_{down}$ is the normalized temperature change rate of the TTR during endothermic process, the center of feature vectors of category i' is denoted by $_iX_{center}=(_i\overline{E}_{Center},_i\overline{V}_{up\_Center},_i\overline{V}_{down\_Center})$;

$f_1(_iX)$ is the Euclidean distance between feature vector $_iX$ and center $_iX_{center}$, and can be calculated according to the following equation:

$$f_1(_iX) = \min \sqrt{(_i\overline{E} - _i\overline{E}_{Center})^2 + (_i\overline{V}_{up} - _i\overline{V}_{up\_Center})^2 + (_i\overline{V}_{down} - _i\overline{V}_{down\_Center})^2}$$

$f_k(_iX), k=2, 3, \ldots, K$ are renumbered Euclidean distances $f_{i'j'}(_iX)$ between feature vector $_iX$ and center $_jX_{center}$ of feature vectors of category j', j≠i', $_jX_{center}=(_j\overline{E}_{Center,j'},\overline{V}_{up\_Center,j'},\overline{V}_{down\_Center})$ and can be calculated according to the following equation:

$$f_{i'j'}(_iX) = \min_{j' \neq i'}\left(-\sqrt{\begin{array}{c}(_i\overline{E} - _j\overline{E}_{Center})^2 + (_i\overline{V}_{up} - _j\overline{V}_{up\_Center})^2 + \\ (_i\overline{V}_{down} - _j\overline{V}_{down\_Center})^2\end{array}}\right)$$

where the initial TTR population corresponding to the approximate solution for multi-objective optimization is chosen according to the two TTR populations respectively corresponding to the two approximate solutions of previous two defect image separations;

(5): putting the RTTRs of K categories by column to create a matrix Y, where a column is a RTTR, which contains T pixel values of the RTTR, the matrix Y is a matrix with size of T×K;

(6): linking the back column to the front column from the first column for each frame of 3D matrix S to obtain T columns of pixels, putting the T columns of pixels together by frame order to create a two-dimensional image matrix O with I×J rows and T columns, then performing linear transformation to matrix Y with two-dimensional image matrix O: $R-=Y^{-1}*O^T$ to obtain a two-dimensional image matrix R, where $Y^{-1}$ is the pseudo-inverse matrix of matrix Y with size of K×T, $O^T$ is the transpose matrix of two-dimensional image matrix O, two-dimensional image matrix R has K rows and I×J columns;

(7): dividing a row of two-dimensional image matrix R into I rows by column size of J, and putting the I rows together by order to obtain a two-dimensional image with size of I×J, where two-dimensional image matrix R has K rows, thus K two-dimensional images are obtained, selecting a two-dimensional image which has maximal difference of pixel value between defect area and non-defect area from the K two-dimensional images;

(8): using Fuzzy C-Mean algorithm to cluster the selected two-dimensional image: obtaining each pixel's cluster according to the pixel's maximal membership, then setting the pixel value of each cluster center to all pixels of the cluster which the cluster center belongs to, where the selected two-dimensional image is turned into a separated image, and converting the separated image into a binary image, where the binary image is the defect image separated from the thermogram sequence.

2. The method for separating out a defect image from a thermogram sequence based on weighted naive Bayesian classifier and dynamic multi-objective optimization of claim 1, wherein the selecting G transient thermal responses (TTRs) from 3D matrix S comprises:

selecting a pixel value $S(i_{zz},j_{zz},t_{zz})$ from 3D matrix S, where the pixel value $S(i_{zz},j_{zz},t_{zz})$ is the maximal pixel value at row $i_{zz}$ and column $j_{zz}$ and satisfies the following equation:

$$\max\left(S(i_{zz}, j_{zz}, t_{zz}) \frac{S(i_{zz}, j_{zz}, t_{mid}) - S(i_{zz}, j_{zz}, t_0)}{t_{mid} - t_0}\right)$$

$t_{mid}$ is the serial number of the last heating frame, $t_0$ is the serial number of the first heating frame;

selecting column $j_{zz}$ of frame $t_{zz}$ from 3D matrix S, and choosing jumping points according to pixel value's variation of column $j_{zz}$ of frame $t_{zz}$, where a jumping point is located between two adjacent pixels which pixel value's difference is greater than a threshold, and the number of jumping points is P, then dividing 3D matrix S into P+1 row data blocks by rows which the P jumping points belong to;

selecting the maximal pixel value $S^p(i_{zz}{}^P, j_{zz}{}^P, t_{zz}{}^P)$ from the $p^{th}$ row data block denoted by $S^p$, $p=1, 2, \ldots, P+1$, where $i_{zz}{}^P$, $j_{zz}{}^P$, and $t_{zz}{}^P$ are respectively the row number, column number and frame number of the pixel which has the maximal pixel value, thus the TTR corresponding to the maximal pixel value $S^p(i_{zz}{}^P, j_{zz}{}^P, t_{zz}{}^P)$ is $S^p(i_{zz}{}^P, j_{zz}{}^P, t_{zz}{}^P)$, $t=1, 2, \ldots, T$;

setting the temperature threshold of $p^{th}$ row data block to $THRE^p$, then calculating the correlation $Re^b$ between TTR $S^p(i_{zz}{}^P, j_{zz}{}^P, t)$ and TTR $S^p(i_{zz}{}^P \pm b, j_{zz}{}^P, t)$, where pixel interval b is set to $1, 2, \ldots$, in order, meanwhile, judging the correlation $Re^b$: when the correlation $Re^b$ is smaller than $THRE^p$, stopping the calculation of the correlation $Re^b$, where pixel interval b is the step length $CL^p$ of the row data block $S^p$;

selecting row $i_{zz}$ of frame $t_{zz}$ from 3D matrix S, and choosing jumping points according to pixel value's variation of row $i_{zz}$ of frame $t_{zz}$, where a jumping point is located between two adjacent pixels which pixel value's difference is greater than a threshold, and the number of jumping point is Q, then dividing 3D matrix S into Q+1 column data blocks by columns which the Q jumping points belong to;

electing the maximal pixel value $S^q(i_{zz}{}^q, j_{zz}{}^q, t_{zz}{}^q)$ from the $q^{th}$ column data block $S^q$, $q=1, 2, \ldots, Q+1$, where $i_{zz}{}^q$, $j_{zz}{}^q$, and $t_{zz}{}^q$ are respectively the row number, column number and frame number of the pixel which has the maximal pixel value, thus the TTR corresponding to the maximal pixel value $S^q(i_{zz}{}^q, j_{zz}{}^q, t_{zz}{}^q)$ is $S^q(i_{zz}{}^q, j_{zz}{}^q, t)$, $t=1, 2, \ldots, T$;

setting the temperature threshold of $q^{th}$ row data block to $THRE^q$, then calculating the correlation $Re^d$ between TTR $S^q(i_{zz}{}^q, j_{zz}{}^q, t)$ and TTR $S^q(i_{zz}{}^q, j_{zz}{}^q \pm d, t)$, where pixel interval d is set to $1, 2, \ldots$, in order, meanwhile, judging the correlation $Re^d$: when the correlation $Re^d$ is smaller than $THRE^d$, stopping the calculation of the correlation $Re^d$, where pixel interval d is the step length $CL^q$ of the column data block $S^q$;

dividing the 3D matrix S into $(P+1) \times (Q+1)$ data blocks by the rows which the P jumping points belong to and by columns which the Q jumping points belong to, where the data block at $p^{th}$ by row and $q^{th}$ by column is $S^{p,q}$;

for each data block $S^{p,q}$, setting a threshold DD and initializing set number $g=1$ and pixel location $i=1, j=1$, then storing the TTR $S(i_{zz}, j_{zz}, t)$, $t=1, 2, \ldots, T$ in set $X(g)$, calculating the correlation $Re_{i,j}$ between set $X(g)$ and the TTR $S^{p,q}(i,j,t)$, $t=1, 2, \ldots, T$ at $i^{th}$ row, $j^{th}$ column, and judging: if $Re_{i,j} < DD$, then $g=g+1$, and storing the TTR $S^{p,q}(i,j,t)$, $t=1, 2, \ldots, T$ in set $X(g)$, otherwise $i=i+CL^p$, and continuing to calculate the correlation $Re_{i,j}$ between set $X(g)$ and the TTR $S^{p,q}(i, j, t)$, $t=1, 2, \ldots, T$ at $i^{th}$ row, $j^{th}$ column and judge, where if $i > M^{p,q}$, then $i=i-M^{p,q}$, $j=j+CL^q$, if $j > N^{p,q}$, then terminating the calculation and judgment, each set $X(g)$ is a selected TTR, $M^{p,q}$, $N^{p,q}$ are respectively the number of rows and the number of columns of data block $S^{p,q}$;

putting selected TTRs of all data blocks together to obtain the G transient thermal responses.

3. The method for separating out a defect image from a thermogram sequence based on weighted naive Bayesian classifier and dynamic multi-objective optimization of claim 1, wherein the initial TTR population corresponding to the approximate solution for multi-objective optimization is chosen according to the two TTR populations respectively corresponding to the two approximate solutions of previous two defect image separations by the following steps:

Step A: randomly selecting $N_E$ feature vectors from TTR population set $_{i'}{}^{-1}PS$ to form a TTR set $_{i'}{}^{-1}PS'$, which is denoted by $_{i'}{}^{-1}PS' = (_{i'}{}^{-1}X'^1, _{i'}{}^{-1}X'^2, \ldots, _{i'}{}^{-1}X'^{N_E})$, randomly selecting $N_E$ feature vectors from TTR population set $_{i'}{}^{-2}PS$ to form a TTR set $_{i'}{}^{-2}PS'$, where $-1$ represents the last defect image separation, $-2$ represents the second-to-last defect image separation, the TTR population set $_{i'}{}^{-1}PS$ corresponds to the approximate solutions of category i' of the last defect image separation, the TTR population set $_{i'}{}^{-2}PS$ corresponds to the approximate solutions of category i' of the second-to-last defect image separation;

then marking the feature vector in TTR population set $_{i'}{}^{-2}PS'$ which is closest to the $n^{th}$ feature vector in TTR population set $_{i'}{}^{-1}PS'$ as $_{i'}{}^{-2}X'^{n'}$, where TTR population set $_{i'}{}^{-2}PS'$ is denoted by $_{i'}{}^{-2}PS' = (_{i'}{}^{-2}X'^1, _{i'}{}^{-2}X'^2, \ldots, _{i'}{}^{-2}X'^{N_E})$;

then calculating the number W of typical individuals in TTR set $_{i'}{}^{-1}PS'$:

$$W = [W_1 + _{i'}{}^{-1}\delta \times (W_2 - W_1)]$$

where $W_1$ and $W_2$ are respectively the lower limit value and the upper limit value of W, and $W_1 = K+1$, $W_2 = 3K$, $_{i'}{}^{-1}\delta$ is estimate of environment change of last defect image separation and obtained according to the following equations:

$$_{i'}{}^{-1}\delta = \frac{\sum_{n'=1}^{N_E} \sqrt{\sum_{k=1}^{K}[f_k(_{i'}{}^{-1}X'^{n'}) - f_k(_{i'}{}^{-2}X'^{n'})]^2}}{N_E \times K}$$

$f_k(_{i'}{}^{-1}X'^{n'})$ is a $f_k(_iX)$ into which feature vector $_{i'}{}^{-1}X'^{n'}$ as feature vector $_iX$ is plugged, $f_k(_{i'}{}^{-2}X'^{n'})$ is a $f_k(_iX)$ into which feature vector $_{i'}{}^{-2}X'^{n'}$ as feature vector $_iX$ is plugged;

Step B: creating a multi-directional prediction set $_{i'}{}^{-1}C$, which includes two parts, where the first part is the center of all feature vectors in TTR population set $_{i'}{}^{-1}PS$ and can be denote by $_{i'}{}^{-1}XC^1$:

$$_{i'}{}^{-1}XC^1 = \frac{1}{_{i'}{}^{-1}N_{PS}} \sum_{n=1}^{_{i'}{}^{-1}N_{PS}} {}_{i'}{}^{-1}X^n$$

$_{i'}{}^{-1}X^n$ is the $n^{th}$ feature vector in TTR population set $_{i'}{}^{-1}PS$, $_{i'}{}^{-1}N_{PS}$ is the number of feature vectors in TTR population set $_{i'}{}^{-1}PS$;

the second part is K extreme solutions of Pareto optimal front, and can be denote by:

$$_{i'}{}^{-1}XC^2, \ldots, _{i'}{}^{-1}XC^{N_C}$$

$N_C$ is the number of feature vectors in multi-directional prediction set $_{i'}^{-1}C$, $N_C=K+1$;

Step C: calculating the Euclidean distance $_{i'}^{-1}D^{nw}=\|_{i'}^{-1}X^n - _{i'}^{-1}XC^w\|_2$ of the $n^{th}$ feature vector $_{i'}^{-1}X^n$, $_{i'}^{-1}X^n$, $n=1, 2, \ldots, _{i'}^{-1}N_{PS}$ from each feature vector $_{i'}^{-1}XC^w$, $w=1, 2, \ldots, N_C$, and putting the $n^{th}$ feature vector $_{i'}^{-1}X^n$ into a cluster set which is corresponding to the feature vector having minimal distance in multi-directional prediction set $_{i'}^{-1}C$, thus TTR population set $_{i'}^{-1}PS$ is clustered into $N_C$ cluster sets which is denoted by $_{i'}^{-1}$Cluster[w], $w=1, 2, \ldots, N_C$;

Step D: If $N_C=W$, outputting multi-directional prediction set $_{i'}^{-1}C$ and the $N_C$ cluster sets; otherwise adding a feature vector $_{i'}^{-1}XC^{Nc+1}$ to multi-directional prediction set $_{i'}^{-1}C$, then updating $N_C$ with $N_C=N_C+1$ and returning to Step C, where feature vector $_{i'}^{-1}XC^{Nps+1}$ is obtained through the following equation:

$$_{i'}^{-1}XC^{Nps+1} = \underset{_{i'}^{-1}X^w}{\arg\max}\, \underset{l}{\max}\, \|_{i'}^{-1}X^{w_l} - _{i'}^{-1}XC^w\|$$

$_{i'}^{-1}X^{w_l}$ is the $l^{th}$ feature vector of $_{i'}^{-1}$Cluster[w], feature vector $_{i'}^{-1}XC^{Nc+1}$ is a feature vector selected from the $N_C$ cluster sets which distance from its cluster center is maximal;

Step E: calculating a prediction direction $\Delta_{i'}^{-1}C = \{\Delta_{i'}^{-1}c^1, \Delta_{i'}^{-1}c^2, \ldots, \Delta_{i'}^{-1}c^W\}$:

$\Delta_{i'}^{-1}c^w = _{i'}^{-1}XC^w - _{i'}^{-2}XC^{w'}, w=1,2,\ldots,W$ where $_{i'}^{-1}XC^{w'}$ is a feature vector in multi-directional prediction set $_{i'}^{-2}C$ of the second-to-last defect image separation which is closest to feature vector $_{i'}^{-1}XC^w$;

Step F: initializing the size of the initial TTR population corresponding to the approximate solution to $N_P$, where $N_P$ is greater than $N_E$;

then creating $N_E$ feature vectors, where the $n'^{th}$ feature vector of the $N_E$ feature vectors is:

$_i X^{n'}(0) = _{i'}^{-1}X^{n'} + \Delta_{i'}^{-1}c^{w_{n'}} + _{i'}^{-1}\varepsilon^{w_{n'}}, n'=1,2,\ldots,N_E$ 0 represents initial value of iteration of the dynamic multi-objective optimization, $w_{n'}$ is the serial number of the cluster set to which feature vector $_{i'}^{-1}X^{n'}$ belongs, $\Delta_{i'}^{-1}c^{w_{n'}}$ is the $w_{n'}^{th}$ element in the prediction direction $\Delta_{i'}^{-1}C$, $_{i'}^{-1}\varepsilon^{w_{n'}}$ is a random number which obeys a normal distribution, the mean of the normal distribution is 0, the variance of the normal distribution is:

$$_{i'}^{-1}\sigma = \frac{1}{W}\sum_{w=1}^{W}|\Delta_{i'}^{-1}c^w|$$

randomly creating $N_P - N_E$ feature vectors;

combining the $N_E$ feature vectors and the $N_P - N_E$ feature vectors to form the initial TTR population corresponding to the approximate solution for multi-objective optimization.

\* \* \* \* \*